United States Patent [19]
Medford

[11] 4,328,137
[45] May 4, 1982

[54] PROCESS FOR RAPIDLY BODYING ORGANOPOLYSILOXANE RESINS

[75] Inventor: George F. Medford, Clifton Park, N.Y.

[73] Assignee: General Electric Company, Waterford, N.Y.

[21] Appl. No.: 159,722

[22] Filed: Jun. 16, 1980

[51] Int. Cl.³ .............................................. C08L 91/00
[52] U.S. Cl. .................................... 525/474; 528/14; 528/15; 528/17; 528/18; 525/475
[58] Field of Search ....................... 528/18, 14, 15, 17; 260/18 S

[56] References Cited

U.S. PATENT DOCUMENTS

| | | | |
|---|---|---|---|
| 3,375,223 | 3/1968 | Merrill | 260/37 SB |
| 3,389,114 | 6/1968 | Burzynski et al. | 260/37 SB |
| 3,865,766 | 2/1975 | Merrill | 260/18 S |
| 4,056,492 | 11/1977 | Merrill | 260/18 S |

*Primary Examiner*—Melvyn I. Marquis
*Attorney, Agent, or Firm*—E. Philip Koltos

[57] ABSTRACT

There is disclosed a method for effecting the controlled rapid condensation of silanol radicals in silanol-containing organopolysiloxanes such as silicone resins. The process is effected by catalyzing such resin with 5 to 350 ppm stannous salt or soap; heating the catalyzed resin until a preselected viscosity is obtained; generating the first catalyst with a relatively moderate second metal soap catalyst, whereupon a condensed or bodied resin can be diluted to a preselected weight percent solids.

12 Claims, No Drawings

PROCESS FOR RAPIDLY BODYING ORGANOPOLYSILOXANE RESINS

BACKGROUND OF THE INVENTION

This invention relates to a method for building up the molecular weight of organopolysiloxane resins. More particularly, it concerns bodying such resins with a metal soap catalyst.

Customarily, silicone resins have been derived from organohalosilanes by a batch process wherein the product is prepared in a series of steps including hydrolysis, solvent stripping and acid control, catalyst addition, and bodying to the desired endpoint viscosity. These products can then be cured in its application usage. Since the resin-making process is carried out batchwise, the time in which a resin can be prepared is at least as long as the sum of the times for the discrete and separable steps. If any of these steps could be accelerated or omitted the overall resin-making process could be expedited. The bodying stage is often the most time consuming segment of this process, taking generally from 2 to 20 hours to complete. A sizable improvement in production rates is realized by accelerating this step alone. Recently, it has been discovered that silicone resins can be prepared from alkoxylated silanes, either as starting materials, or as prepared in situ from related organohalosilanes. These organoalkoxysilanes can now be manufactured continuously, affording large volumes of nearly acid-free starting materials. Due to the minimized tendency toward gellation in a low acid medium, a hydrolysis step involving alkoxylated silanes is essentially a worry-free system and is thus, a good candidate for a continuous process as well. In either case, time is still saved by omitting the acid reduction step. With both starting materials and hydrolyzed materials being supplied at a faster rate, the already identified bodying bottleneck can be expected to worsen. Thus, a rapidly bodying catalyst is needed now and is even more necessary with the advent of continuous processing. The process of the present invention provides rapidly bodied resins which avoid the above described disadvantages as well as those described in the prior art.

Several methods have been available in the prior art, for building up the viscosities of silanol-containing organopolysiloxane resins in a controlled manner. This process, known as "bodying," is designed to increase the molecular weight of organopolysiloxane hydrolyzates to make them more valuable in resin applications. During bodying, condensation of silanol radicals are effected in the hydrolyzate to lengthen the shelf life and decrease the cure time. If bodying is not carried out in a well-controlled fashion, however, premature gellation of the organopolysiloxane resin will occur, and cause total loss of the batch.

Britton, et al., U.S. Pat. No. 2,460,805, teach that organopolysiloxane polymers can be bodied with acid activated clays, such as bentonite and other hydrous aluminum silicates. Activation of the clay is accomplished by heat treatment with strong acids, namely sulfuric acid and phosphoric acid. On the other hand, R. N. Meals and F. N. Lewis, "Silicones," Reinhold Publishing Co., (1959), page 134, disclose that bodying can be carried out with metal soap catalysts, such as zinc octoate.

Both methods have disadvantages in practice, however. Acid activated clays appear to function best only if the bodying temperature is raised to the order of 200° C. at which temperature process control becomes difficult—the more useful solvents boil well below this, too; and, with either acid clay bodying or metal soap catalyzed bodying, the shelf life at 25° C. is often less than 3 months.

Other methods for bodying such resins are disclosed by Merrill, U.S. Pat. Nos. 3,375,223, 3,865,766 and 4,056,492 which are assigned to the assignee of the present application, and incorporated herein by reference. In these methods the silanol-containing resin is heated in the presence of a hydrogen chloride activated particulated siliceous material, e.g., diatomaceous earth and optionally a very low level of metal soap catalyst, and the bodying is carried out efficiently at temperatures substantially lower than that required with acid activated clays. Moreover, because the level of metal soap catalyst used is very low, the bodied resin is not contaminated with metal ions which, in high amounts, can impair the stability of the cured resin, as well as substantially reduce its shelf life. The drawback to this method of bodying is in the lengthy extraction by filtration of large volumes of the particulated siliceous material and the associated inefficient use of kettle volume.

The present invention provides a process wherein certain aggressive bodying catalysts can be utilized to partially condense silanol-containing organopolysiloxane resins is a controlled manner. Lengthy filtration is not necessary.

Group IV A metal soaps such as stannous octoate have been known as aggressive condensation catalysts. They are used in the industry as cure catalysts primarily in rubbers, and in Room Temperature Vulcanizable (RTV) products wherein essentially complete condensation is required. Prior to the present invention group IV A metal soaps have not been used to body or partially condense silanols. The reason for this lies in the heretofore lack of control over these aggressive catalysts. Typically, group IV A soaps such as stannous octoate or plumbous octoate remain active at room temperature, slowly increasing the viscosity of the resin beyond the desired end point. The lack of adequate shelf-life can render a resin useless for its intended purpose, and may relegate it to waste entirely.

In response to the need for an accelerated bodying step, a quenching technique was discovered which allows the use of rapid stannous soap condensation catalysts for silicone resin bodying. It was observed, for instance, that metal soaps such as zinc octoate or manganese neodecanoate effectively and rapidly quench the extremely active stannous octoate. Octanoic acid and its various salts such as potassium or tetra-n-butyl ammonium octanoate effect similar quenching of stannous octoate. Using this quenching system, bodied resins which would otherwise have gelled in less than two days at room temperature showed no further build up in their viscosity upon quenching while curing and performing normally in a final application such as for paint vehicals, electrical junction coatings, etc.

Experiments readily attest to the fact that bodying with $Sn^{II}$ octoate can be effectively quenched. The use of $Sn^{II}$ octoate for bodying allows either greatly reduced process times or temperatures or both. Savings can result from higher throughput and possibly continuous bodying, or from a reduction in energy consumption afforded by bodying temperatures which are substantially lower than reflux. Other tin catalysts such as stannous stearate and dibutyltin dilaurate are less rapid and are less attractive catalysts.

Furthermore, it has been found that bodying with stannous octoate and quenching the catalyst in accordance with the process of the present invention ordinarily results in lower levels of undesirable benzene by-products. This is because the low acid levels of the present process offer fewer opportunities for phenyl cleavage.

It is therefore an object of the present invention to provide a process for rapidly bodying silanol-containing organopolysiloxane resins. Another object is to controllably quench the rapidly bodied resin so as to produce a resin of desired viscosity.

Another object is to provide a process utilizing an aggressive stannous soap or salt catalyst to produce the desired resin products.

Another object is to provide a process which produces the same resin products as those produced by processes requiring much longer bodying periods.

These and other objects will become apparent to those skilled in the art upon careful consideration of the accompanying specification and claims.

SUMMARY OF THE INVENTION

The present invention provides a process for effecting the controlled rapid condensation of silanol radicals in a silanol-containing organopolysiloxane which comprises the steps of adding to silanol-containing organopolysiloxane resin solids, from 5 to 350 parts by weight of a metal catalyst per million parts of said resin solids. The metal catalyst is an agressive silanol condensation or "bodying" catalyst which is selected from among stannous salts and stannous soaps. The amount of catalyst is measured by calculating the relative amount of metal contained therein per million parts of the resin to be bodied.

Next the catalyzed silanol-containing organopolysiloxane resin is heated to a temperature of from 50° C. to 200° C., as desired according to well known bodying techniques. As the catalyzed resin is heating it is possible to remove all or part of the so-called water of condensation which is produced as the silanol condensation reactions proceed. The heating step is optimally continued for an amount of time effective for achieving a preselected intermediate viscosity. That is to say, bodying is continued to some point short of the desired endpoint, since after the aggressive bodying catalyst is quenched, it is possible to continue bodying at a relatively more moderate rate until the ultimate desired viscosity of the resin is obtained. Those skilled in the art will recognize that the viscosity of the resin will influence the final product. Often these bodied resins are utilized in various vehicles and are cut by solvents.

After sufficient bodying has taken place to achieve the desired intermediate viscosity, the aggressive stannous metal catalyzed resin is quenched by reacting the mixture with a relatively moderate bodying catalyst selected from various metal soaps. The moderate bodying catalyst not only quenches the aggressive catalyst but it is effective for continuing the bodying reaction at a slower, more controllable rate, to a desired, preselected bodying endpoint. Next the bodied resin can be diluted with a number of compatible organic solvents such as toluene or xylene. The solvent dilution has several advantageous effects. It not only helps to cool the bodied resin, it reduces the effectiveness of any residual moderate bodying catalyst and it influences the viscosity of the resinous final product. A stable product is ordinarily cooled to between approximately, 20° to 30° C.

The aggressive bodying catalysts useful in the present invention are selected from the group of $Sn^{II}$ compounds having the following general formula:

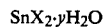

$$SnX_2 \cdot yH_2O$$

wherein X represents a halide or carboxylate group such as

$$-O\overset{\overset{\displaystyle O}{\|}}{C}R$$

and R is a monovalent hydrocarbon radical having from 1 to 20 carbon atoms and y is any non-negative number, such as 0, 1, 2, 3, etc.

Among the particularly useful aggressive bodying catalysts are stannous acetate, stannous stearate, stannous 2-ethylhexoate (also known as stannous octoate) and stannous chloride dihydrate. At least about 5 parts tin metal is ordinarily required to catalyze each million parts of silicone hydrolyzate resin solids.

The silicone hydrolyzate resin to be bodied is comprised of chemically combined siloxy units derived from the hydrolysis of halosilanes or alkoxysilanes or a mixture of both types of silanes having the formula:

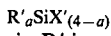

$$R'_a SiX'_{(4-a)}$$

wherein R' is a substituted or unsubstituted monovalent hydrocarbon radical and wherein a averages from, approximately, 1.2 to 1.8, but on any individual silicon atom a is 1 to 2, and X' is a halogen such as Cl or Br or an alkoxy radical such as $-OCH_3$ or $-OC_2H_5$.

Often, the resin to be bodied is not at 100% solids. That is to say, the hydrolyzate resin is carried in a solvent such as toluene. In fact, generally this will be the case. When the hydrolyzate resin is contained in a solvent the process of the present invention may optionally include a solvent stripping step, as is well known in the art.

The relatively moderate bodying catalyst mentioned above is utilized to quench the catalytic action of the aggressive stannous metal. The mechanism for this quenching action is not wholly understood but it has been discovered that certain metal soaps and particularly metal carboxylates will have a sufficient quenching effect upon the stannous bodying catalyst. Ordinarily, at least one mole of quenching metal in the form of the moderate bodying catalyst will be required to quench the aggressive catalyst. Note, however, that if sufficient amounts are utilized, not only will the aggressive catalyst be quenched but it will be possible to continue the bodying reaction to a desired endpoint at a moderate and easily controlled rate.

Those skilled in the art will recognize that the present invention is particularly useful when the resin bodying is carried out in batches but that it may be also adapted for processes wherein it would be possible to body resins on a continuous basis. It is only necessary to apply the various steps of the present process in a continuous manner to a resin hydrolyzate process stream.

DESCRIPTION OF THE INVENTION

The fundamental concept of the process of the present invention lies in the ability to rapidly body a silicone resin hydrolyzate from a low molecular weight state to a point just prior to a desired higher weight, with a related increase in viscosity. It is then possible to gradually continue the bodying to a selected final state. This process is achieved by first utilizing an aggressive bodying catalyst which can then be deactivated in situ upon replacement with a relatively more moderate catalyst.

It has been discovered that certain tin salts or soaps which are very agressive bodying catalyst are suitable for use in the present process, only because these catalysts are readily controllable through a quenching technique to be described herein. Thus resins of desired viscosity are rapidly provided while the problem of premature gellation of such resins heretofore associated with stannous soap bodying is significantly lessened.

Suitable aggressive bodying catalysts used in the initial portion of the bodying process include any of several Tin II or stannous salts or soaps. These tin catalysts include stannous octoates, stannous stearates, stannous acetates, and stannous hexanoates. Also contemplated as useful would be the halide salts such as stannous chloride, normally as the dihydrate. Of these, stannous "octoate" is preferred since it is particularly effective.

Stannous octoate is a viscous liquid having an approximate tin content of 27%, and is comprised of tin metal which is complexed with two 2-ethyl hexoate groups. Dissolving this stannous octoate in toluene or similar solvent can make it easier to handle in certain applications. It should be noted that at least approximately 5 parts tin metal is necessary per million parts silicone resin to be bodied at 200° C. Those skilled in the art will recognize that the lower limit of catalyst can be adjusted according to process conditions. On the other hand, an upper limit is unnecessary since any large amount of tin will catalyze the resin compound. A useful upper limit however is probably 350 ppm tin metal.

The present invention is based upon the discovery that organopolysiloxane hydrolyzate resins predominately of formula (I) can be rapidly and controllably bodied to a higher molecular weight:

$$(R')_a SiO_{(4-a)/2} \qquad (I)$$

wherein R' is selected from alkyl and aryl monovalent hydrocarbon radicals, and a has a value equal to, approximately, 1.2 to 1.8. On the whole, it is recognized that approximately 2-20% by weight may be present as unhydrolysed or uncondensed functional groups such as holosilane, alkoxysilane or silanol.

Radicals included by R' of Formula I are alkyl and chloroalkyl radicals, such as methyl, ethyl, chloroethyl, propyl, octyl, etc.; aryl and chloroaryl radicals, including phenyl, chlorophenyl, dichlorophenyl, diphenyl, naphthyl, tolyl, xylyl, etc. Where R' in Formula I can represent more than one radical, these radicals can be all the same or any two or more of the aforementioned radicals.

The organopolysiloxane hydrolyzate that can be bodied in accordance with the practice of the invention, can be made by hydrolyzing organohalosilane or organoalkoxysilanes having the formula:

$$(R)_b SiX''_{4-b} \qquad (II)$$

where R is as defined above, b is an integer equal to 1 or 2, and X" is a halogen radical, such as chloro or bromo, or an alkoxy radical such as —OCH₃ or —OC₂H₅. Specific examples of the organohalosilanes included by Formula 2 are methyltrichlorosilane, dimethyldichlorosilane, methylphenyldichlorosilane, phenyltrichlorosilane, diphenyldichlorosilane, etc.

Mixtures of the above-mentioned organohalosilanes can be employed in the practice of the present invention to produce the desired organopolysiloxane resins. Hydrolysis of the mixture of halosilanes included by Formula 2 is described in Rochow, Chemistry of the Silicones (2nd edition), John Wiley and Sons, New York, on pages 90 through 94. This hydrolysis procedure also includes hydrolysis of the organohalosilane of Formula 2 in the presence of aliphatic alcohols, hydrolysis involving the addition of water to organohalosilane of Formula 2, etc. Mixtures of the above mentioned organoalkoxysilanes can also be employed in the practice of the present invention to produce the desired organopolysiloxane resins. Hydrolysis of the mixture of alkoxysilanes included by Formula 2 is taught in U.S. Pat. No. 3,389,114 Burzynski and Martin, which is hereby incorporated by reference.

The present invention provides a method of bodying organopolysiloxanes of Formula I which comprises adding an aggressive bodying catalyst selected from stannous salts and soaps to a silicone hydrolyzate resin in order to initiate the bodying reaction at a rapid rate; and heating the catalyzed resin in order to remove so-called water of condensation which is produced when silanol groups condense to form a bodied resin. The heating step ordinarily takes place for an amount of time effective for achieving a bodied resin having a preselected intermediate viscosity. Those skilled in the art will recognize that this viscosity is referred to as intermediate because ordinarily those bodied resins are themselves intermediate products which will be further treated in order to produce in desirable final product having a predetermined final viscosity. This further treatment will ordinarily be no more than cutting the bodied resin with some solvent to produce a final product. Next, the heated and aggressively catalyzed resin is quenched by reacting it with a moderate bodying catalyst which is effective for continuing the bodying reaction at a relatively slower and more controllable rate in order to more accurately achieve the predetermined intermediate viscosity discussed above. The bodied resin is then ordinarily diluted with a solvent to produce a product having a desirable final viscosity. The dilution step will usually also entail cooling of the bodied resin, however, a separate cooling step can be utilized if desired. The so called "quench catalyst" can be added at any time, even prior to adding the stannous salt or soap. It must be recognized however that the fastest bodying rates are those achieved while the stannous salt or soap is acting as the sole metal catalyst for condensing silanols.

The mixture of organopolysiloxane hydrolyzate and the aggressive bodying catalyst can be heated to a temperature between 50° C. to as high as 200° C. to effect a molecular weight increase in the organopolysiloxane hydrolyzate. A suitable organic solvent can be employed in the mixture to facilitate the polymerization and separtation of the resulting bodied organopolysiloxane hydrolyzate. Suitable organic solvents include, for example, toluene, xylene, tetrahydrofuran, butyl acetate, butyl ether, trichloroethylene, etc. Experience has shown that effective bodying results can be achieved if a solution of the organopolysiloxane hydrolyzate is utilized having a concentration of at least 50% by weight of the solution of organopolysiloxane hydrolyzate. Preferably, a solution of organopolysiloxane hydrolyzate in organic solvent is employed having a concentration of 75% to 90% by weight of solution of the organopolysiloxane hydrolyzate. A solvent stripping step can be added when the hydrolyzate resin is at less than 100% solids.

Bodying time can vary between 2 hours or less to 5 hours or more depending upon the organopolysiloxane hydrolyzate, temperature, catalyst concentration, viscosity desired, etc. A convenient method for determining the point at which the organopolysiloxane hydrolyzate has reached a predetermined increase in viscosity is to employ a Zahn viscosimeter. The Zahn viscosimeter, as described in General Electric Review, No. 40, 35–36 (1937), can be employed to measure viscosity, by duration of flow. At the desired viscosity, based on the flow time of an appropriate Zahn viscosimeter, the heating of the mixture can be terminated; it can be allowed to cool to room temperature. The concentration of solvent can be adjusted before or after the aggressive catalytic material is quenched. If desired, the material can be allowed to cool to room temperature.

Contemplated for use in the present invention are those aggressive stannous salts and soaps having the following general formulas:

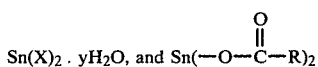

$$Sn(X)_2 \cdot yH_2O, \text{ and } Sn(-O-\overset{\overset{O}{\|}}{C}-R)_2$$

In these tin II compounds X represents a halogen atom such as chlorine, y is any positive number but will usually equal 0, 1, or 2, and R is an monovalent hydrocarbon radical such as a saturated or unsaturated, straight or branched chain alkyl group having from 1 to 20 carbon atoms. Among the particularly effective and preferred stannous compounds are stannous chloride, stannous acetate, and, stannous 2-ethyl hexoate.

It will be recognized by those skilled in the art that the amount of bodying catalyst will depend on various process parameters as well as the desired final product. For example it is well known that hydrolyzate resins having a relatively high T unit concentration will normally require less catalyst at given process conditions than another resin having either a high D unit concentration or one with a relatively low silanol group content. These latter types of resins would probably require greater amounts of a stannous compound in order to achieve bodying.

After the aggressive bodying catalyst has increased the molecular weight of the resin to a point near that which is desired it is necessary to quench the bodying catalyst. The aggressive bodying catalyst can be effectively quenched by reacting it with a relatively more moderate catalyst. The initial stannous catalyst becomes deactivated through a process which is not fully understood at this time. However, since the stannous catalyst is rendered less active the bodying of the resin can continue with the characteristics of the second moderate catalyst which has been used as a quench. It is thought that any benign metal octoate maybe utilized as a quenching agent, included among these would be calcium octoate, manganese octoate, and cobalt octoate. One skilled in the art can see the advantage in the present invention where it is now possible to body a silicone resin very rapidly to a point just short of the desired end point and then a moderate catalyst can continue the bodying at a normal pace to a desired end point. In effect, the resin bodying is a partial or controlled condensation of the silanol groups in a silicone resin. This is to be distinguished from the stannous catalysts utilized in silicone RTV applications, wherein such aggressive catalysts condense essentially all of the silanol groups to form a cured product at its final state. It is not desirable to allow such complete condensation in silicone resins since these resins are ordinarily intermediate products which will then be used for other purposes and which require a measurable amount of active silanols as well as the higher molecular weight. "Active" silanol means that which is readily condensed upon curing. Thus although silicone RTV sometimes use tin catalyst for curing purposes, it is used for exhaustive condensation of active silanols and can preclude further curing. This is to be distinguished from the present invention wherein it is desired to only partially condense the SiOH groups. It is also to be noted that although the various aggressive stannous salts and soaps are quite effective for use in the present invention, the various stannic salts are not as effective although they are used in RTV processes.

The hydrolyzate resin which will be bodied by the process of the present invention can be obtained from any of the several routes which are known in the silicone arts as for example from chlorosilane starting materials or alkoxysilane starting materials. When one desires to body alkoxy resins by the process of the present invention it is necessary to note the acid content of such hydrolyzed resin because ordinarily acid has been previously added to the facilitate hydrolysis as taught in U.S. Pat. No. 3,389,114. In prior art bodying processes it was necessary to reduce the content of the acid in the hydrolyzed resin through an extra washing and separating step since the acid itself could act as a bodying catalyst. One of the advantages of the present process, however, resides in the fact that the stannous bodying catalysts utilized herein are relatively unaffected by varied levels of acid in the resin.

For example, when the acid is left in it could affect the chosen catalyst by either slowing up or speeding bodying, however, when stannous octoate or other stannous catalyst is utilized there is no observed effect on the catalysis. Note however that if the acid level is relatively too high in the resin this may cause a phenyl clevage in the resin thereby causing an undesirable benzene byproduct. Thus, at least at relatively low levels of acid, the catalysts of the present invention are relatively unaffected by the acid levels.

The rates of extremely active stannous catalysts are relatively impervious to the rate altering effects of varied acid levels. Both factors, speed and rate reproducibility, render such a catalyst system probably highly compatible with a continuous process for making silicone resins.

It is to be understood that the various steps of the process of the present invention can be carried out in various sequences. Bodying is fastest, however, if the rapid bodying catalyst is utilized early and when the moderate bodying catalyst is utilized afterwards. For example, the heating step and first addition of agressive catalyst can be accomplished in either order, or if prefered, each could be accomplished partially in increments until the step is wholly completed. Adding the stannous catalyst after the moderate bodying catalyst will result in slower condensation rates than those attained by stannous catalyst alone.

Among the moderate bodying catalysts useful as quenching agents in the present invention are metal soaps such as the octoates, neodecanoates and stearates of such metals as zinc, manganese, cerium, zirconium and cobolt. It is felt also that octanoic acid alone without a metal complex may also be effective.

The following examples are illustrative of the present invention but are not intended to limit its scope in any way.

EXAMPLE 1

In a distilling flask was mixed 209 g (1.5 mole) methyltrimethoxysilane, 298 g (1.5 mole) phenyltrimethoxysilane, 120 g (1.0 mole) dimethydimethoxylsilane, and 249 g (1.0 mole) diphenyldimethoxysilane. Titrated in the presence of tetrabromophenolphthalein ethyl ester, the alkoxy silane mixture contained 5 ppm HCl. The addition of 250 ml (14 mole) distilled water containing 40 ppm concentrated HCl over a period of 10 minutes was followed by a one-hour reflux at 76° C. After refluxing, the reaction was stripped to 95° C. followed by further stripping under reduced pressure (approximately 250 torr) to 115° C. The high solids hydrolyzate resin was adjusted to 72% solids with the addition of 250 ml toluene. The hydrolyzate resin contained 12 ppm HCl and 7.6% OH and 2.0% OCH$_3$ (based on solids).

Of this hydrolyzate solution, 123.1 g containing 89 g resin solids was transferred to a smaller distilling flask for bodying. To this was added 0.16 ml stannous octoate solution containing 0.014 g Sn (0.12 mole) in mineral spirits and toluene. Heat was applied and water of condensation and some solvent were distilled from the pot. After 29 minutes and at a final pot temperature of 134° C., 1.0 ml calcium octoate (0.046 g, 1.1 mole Ca) was introduced to the solution, and the heat was removed. Immediately, toluene (80 ml) was added to the pot, affording a bodied resin with a viscosity of 55 cstks at 53% solids. The calcium octoate-quenched resin showed little change in viscosity within 24 days at room temperature at which time the viscosity measured 54 cstks. A similarly bodied resin with no quench added gelled solid within 48 hours.

EXAMPLE 2

A 126.7 g aliquot of the hydrolyzate resin prepared in Example 1 was used for lower temperature bodying by tin. Thus, the hydrolyzate, containing 92 g resin solids, was stripped to 139° C. over 29 minutes, and was then cooled to 60° C. With the addition of 0.40 ml stannous octoate (0.036 g, 0.30 mmole Sn), bodying progressed for one hour at 60°. Toluene (80 ml) was added and the resultant solution at 50% solids had a viscosity of 57 cstks. To this was added 0.1 ml (0.006 g) of calcium octoate, thereby having a calcium content of 0.11 mmole. After 22 days at room temperature the viscosity was 40 cstks.

EXAMPLE 3

A hydrolyzate resin was prepared adding a mixture of 179.4 g (1.2 mole) methyltrichlorosilane, 253.8 g (1.2 mole) phenyltrichlorosilane, 103.2 g (0.8 mole) dimethyldichlorosilane and 202.5 g (0.8 mole) diphenyldichlorosilane to a mixture of 2217 g water, 665 g toluene and 297 g acetone over a period of 40 minutes and at a maximum temperature of 70° C. An additional 30 minutes stirring was followed by a phase separation from which the top resinous phase was separated and washed with 70 g water and separated again. This resin solution was then stripped to 120° C. and 61.3% solids and contained 8 ppm HCl. 170 g of this hydrolyzate resin was prepared for bodying by stripping to 140° C. Next was added 86 ppm tin in the form of stannous octoate based upon the weight of resin solids. The bodying reaction was maintained at 140° C. by heating while azeotroping out water of condensation collecting it in a Dean-Stark trap and returning the solvent back to the pot under constant reflux. After 1.1 h, 95 ppm zinc metal as zinc octoate based on resin solids was added and the quench reaction continued as above at 140° C. After a total time of 1.5 h, 80 g toluene was added and the resin was allowed to cool for final adjustment with toluene to 50% organopolysiloxane solids. The final viscosity was 85 cstks. After one week at room temperature the resin viscosity was 79 cstks, and after 7 months it was 81 cstks.

EXAMPLE 4

It is contemplated that the process of the present invention can be utilized in the following continuous fashion. A metered stream of alkoxysilanes or chlorosilanes or mixtures thereof can be continuously hydrolyzed by known means in a tube or tank wherein acid induced hydrolysis and silanol condensation takes place to an extent determined by process conditions such as temperature, residence time etc. A continuous stripped can then provide a nearly 100% solids hydrolyzate stream which is ready for bodying. Solvent can be first added to this resin if desired, whereupon one or several injections of stannous metal catalyst can initiate the bodying reaction. Ordinarily, a downstream injection of moderate quenching catalyst will be preferred. Further downstream, or coincidental with the quenching step, an azeotroping stage could continually remove any amount of water of condensation, as desired. Later, a cooling unit or solvent addition, or both, can also be utilized on a continuous basis. Thus the out-flow of the continuous process stream would be a stable bodied resin of a desired viscosity.

What is claimed as new and desired to be protected by Letters Patent of the United States is:

1. A process for effecting the controlled rapid condensation of silanol radicals in a silanol-containing organopolysiloxane comprising the steps of:

adding to silanol-containing organopolysiloxane resin solids, 5 to 350 parts calculated as metal by weight of a silanol condensation catalyst per million parts resin solids wherein said silanol condensation catalyst is a stannous salt effective for rapidly bodying said organopolysiloxane resin;

heating said catalyzed silanol-containing organopolysiloxane resin to a temperature between 50° C. and 200° C. for an amount of time effective for increasing the molecular weight of said organopolysiloxane resin;

quenching said stannous metal catalyzed resin by reacting said silanol condensation catalyst with a metal soap catalyst wherein said metal soap catalyst is effective for quenching said stannous salt catalyst and is a relatively less effective silanol condensation catalyst than said stannous salt catalyst.

2. A process as in claim 1 wherein said stannous salt condensation catalyst has the general formula:

$SnX_2 \cdot yH_2O$ wherein X represents a halide, or carboxylate, R represents a monovalent hydrocarbon radical having from one to twenty carbon atoms, an y is a non-negative number.

3. A process as in claim 2 wherein said stannous salt catalyst is selected from the group consisting of stannous acetate, stannous stearate, stannous 2-ethyl hexoate and stannous chloride dihydrate.

4. A process as in claim 1 wherein said silicone hydrolyzate resin is composed of chemically combined siloxy units derived from the hydrolysis of halosilanes or alkoxysilanes or a mixture thereof wherein the individual silanes have the formula $R'_a SiX_{(4-a)}$ wherein $R'$ is a substituted or unsubstituted monovalent hydrocarbon radical and a averages approximately 1.2 to 1.8 but on any individual silicon atom a is 1 or 2, and wherein X is a halogen selected from Cl or Br, or an alkoxyradical selected from $-OCH_3$ or $-OC_2H_5$.

5. A process as in claim 1 wherein said heating step is effective for decreasing some or all of said water of condensation.

6. A process as in claim 1 wherein there is utilized at least 1.0 moles metal in said metal soap catalyst per mole tin metal.

7. A process as in claim 1 wherein said bodied resin is diluted with a hydrocarbon solvent compatible with said bodied resin.

8. A process as in claim 1 wherein said steps are carried out continuously thereby rapidly bodying a silicone hydrolyzate resin process stream.

9. A process as in claim 1 wherein said metal soap catalyst is effective for continuing said bodying reaction after quenching said stannous salt catalyzed bodying reaction.

10. A process as in claim 1 further comprising the step of cooling said bodied resin to a temperature of between 20° to 30° C.

11. A process as in claim 1 wherein the metal of said metal soap catalyst is selected from the group consisting of calcium, zinc, manganese, cerium, zirconium, and cobalt and said soap is selected from the group consisting of octoates, stearates, and neodecanoates.

12. A process as in claim 1, further comprising the steps of diluting said bodied resin; halting the catalytic activity of said metal soap catalyst; and obtaining a bodied resin of desired molecular weight.

* * * * *